United States Patent [19]

Imazeki et al.

[11] Patent Number: 5,235,449
[45] Date of Patent: Aug. 10, 1993

[54] POLARIZER WITH PATTERNED DIACETYLENE LAYER, METHOD FOR PRODUCING THE SAME, AND LIQUID CRYSTAL DISPLAY DEVICE INCLUDING SUCH POLARIZER

[75] Inventors: Shuji Imazeki; Yasushi Tomioka; Naoki Tanaka; Tatsuo Kanetake; Seiichi Kondo, all of Saitama; Yoshio Taniguchi, Hino; Katsumi Kondo, Katsuta; Hideaki Kawakami, Chiba, all of Japan

[73] Assignee: Hitachi, Ltd., Tokyo, Japan

[21] Appl. No.: 662,642

[22] Filed: Mar. 1, 1991

Related U.S. Application Data

[63] Continuation-in-part of Ser. No. 584,971, Sep. 19, 1990.

[30] Foreign Application Priority Data

Mar. 2, 1990 [JP] Japan .................... 2-049347

[51] Int. Cl.$^5$ ..................... G02F 1/1335; G02B 5/30
[52] U.S. Cl. ..................... 359/63; 359/485; 359/492; 359/500
[58] Field of Search ............ 359/63, 64, 485, 492, 359/500

[56] References Cited

U.S. PATENT DOCUMENTS

| | | | |
|---|---|---|---|
| 4,863,763 | 9/1989 | Takeda et al. | 427/355 |
| 5,007,715 | 4/1991 | Verhulst | 359/63 |
| 5,122,890 | 6/1992 | Makaw | 359/64 |

FOREIGN PATENT DOCUMENTS

| | | | |
|---|---|---|---|
| 0076049 | 7/1978 | Japan | 359/63 |
| 0031318 | 2/1983 | Japan | 359/63 |
| 0120220 | 7/1983 | Japan | 359/63 |
| 0058419 | 4/1984 | Japan | 359/63 |
| 0216337 | 10/1985 | Japan | 359/63 |
| 0222824 | 11/1985 | Japan | 359/63 |
| 0059428 | 3/1986 | Japan | 359/63 |
| 0278827 | 12/1986 | Japan | 359/63 |
| 0201626 | 8/1988 | Japan | 359/63 |

OTHER PUBLICATIONS

J. Nehring et al, "High-pretilt polyphenylene layers for liquid-crystal displays", Applied Physics Letters, vol. 51, No. 16, Oct. 19, 1987, New York, US, pp. 1283–1284.

(List continued on next page.)

Primary Examiner—Andrew J. James
Assistant Examiner—Anita Pellman Gross
Attorney, Agent, or Firm—Pennie & Edmonds

[57] ABSTRACT

A method for producing a polarizer patterned with a plural number of portions having a polarizing ability or direction of polarization comprising the first step of producing a surface oriented in a pre-determined direction on a substrate, the second step of producing a polymerizable molecular layer which comprises polymerizable molecules on the above surface, the third step of polymerizing the molecules in said polymerizable molecular layer into a desired pattern and the fourth step of removing the unpolymerized portion of said polymerizable molecular layer. For example, the following procedure is repeated on one surface of a substrate to be given a polarizing ability: (1) An organic thin film uniformly oriented in a particular direction is produced by the Langmuir-Blodgett method, (2) a polymerizable molecular layer is produced on the above thin film, (3) the molecules in the polymerizable molecular layer is polymerized into a desired pattern and (4) the portion left unpolymerized of the polymerizable molecular layer is removed. By this treatment, a polarizer having as many orientation directions as the number of repetitions is obtained. The orientational order can also be given by rubbing in place of the Langmuir-Blodgett method.

19 Claims, 8 Drawing Sheets

OTHER PUBLICATIONS

M. Sugi, "Langmuir-Blodgett films—a course towards molecular electronics: a review," Journal of Molecular Electronics, vol. 1, 1985, Chichester, GB, pp. 3-17.

D. Nerger et al, "Polyesters and Polyurethanes as prepolymerized materials for Langmuir-Blodgett films: preparation and characterization of multilayers," Thin Solid Films, vol. 178, No. 1, Nov. 1, 1989, Netherlands, pp. 253-259.

Y. Nishikata et al, "Preparation and properties of poly (p-phenylene) Langmuir-Blodgett film", Thin Solid Films, vol. 179, No. 1, Nov. 11, 1989, Netherlands, pp. 191-197.

D. Lupo et al, "Structure and properties of Langmuir-Blodgett films made from polyamides," Thin Solid Films, vol. 178, No. 1, Nov. 11, 1989, Netherlands, pp. 403-411.

I. Watanabe et al, "Fabrication of novel electrically conductive Langmuir-Blodgett thin films of the poly(-3-alkyl-thiophenes)," Thin Solid Films, vol. 179, No. 1, Nov. 11, 1989, Netherlands, pp. 199-206.

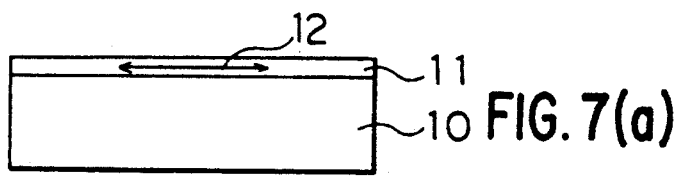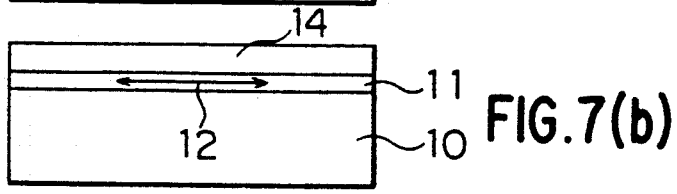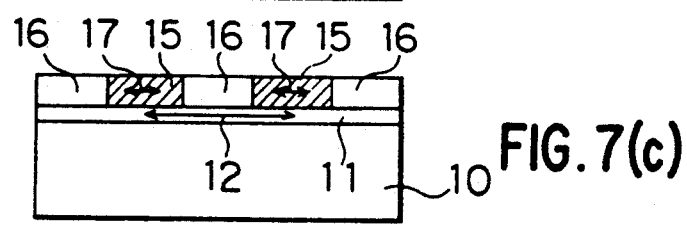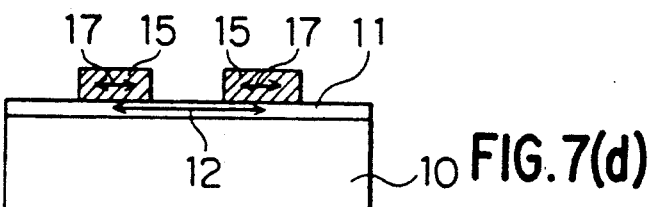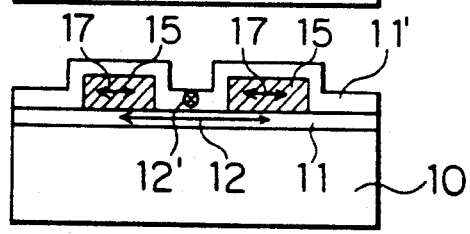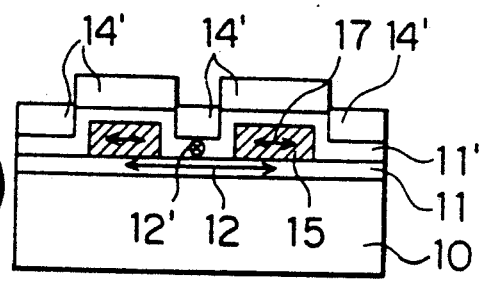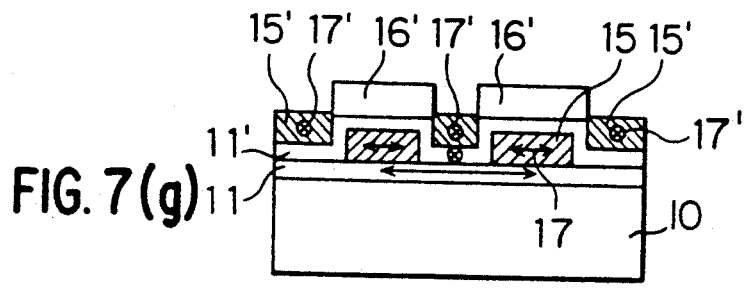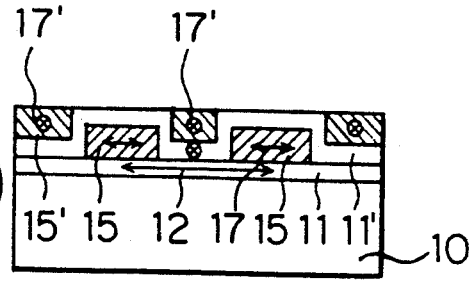

POLARIZER WITH PATTERNED DIACETYLENE LAYER, METHOD FOR PRODUCING THE SAME, AND LIQUID CRYSTAL DISPLAY DEVICE INCLUDING SUCH POLARIZER

BACKGROUND OF THE INVENTION

This application is a continuation-in-part of a copending U.S. application Ser. No. 07/584,971, filed Sep. 19, 1990, the disclosure of which is hereby incorporated by reference.

Field of the Invention

The present invention relates to a polarizer patterned with a portion having a polarizing ability of a direction of polarization, or a polarizer containing in the same surface a plural number of portions which are different in polarizing ability or direction of polarization therebetween, a method for producing the same and liquid crystal display devices using the same.

Description of the Prior Art

Conventional methods for producing a patterned polarizer containing in the same surface a plural number of portions which are different in polarizing ability or direction of polarization therebetween are disclosed in Japanese Patent Application Kokai Nos. 54-32342, 54-38142, 60-184206, 63-158525, etc.

(1) The method disclosed in Japanese Patent Application Kokai No. 54-32342 is a method of obtaining a polarizer containing a portion having a polarizing ability and a portion having no polarizing ability in the same surface by firstly producing a polarizer having the same polarizing ability and direction of polarization in the same surface by the usual method, printing with a heat-resistant masking agent on the polarizer by the screen printing technique, and then irradiating the polarizer with infrared rays to remove the polarizing ability from the portion not covered with the masking agent.

(2) The method disclosed in Japanese Patent Application Kokai No. 60-184206 is a method of obtaining a polarizer containing a portion having a polarizing ability and a portion having no polarizing ability in the same surface by producing a polyvinyl alcohol film on a substrate, applying a photoresist film on the film, exposing the film to light through a pattern mask, developing the exposed resist film so as to allow the polyvinyl alcohol film to partially appear, and then dyeing the exposed portion with iodine or a dye in the same manner as in the production of common polarizers to give it a linear polarizing ability.

The method disclosed in Japanese Patent Application Kokai No. 63-158525 is a method of obtaining a polarizer containing in the same surface portions which are different in the direction of polarization therebetween by repeating the above procedure twice and changing the stretching direction of the polyvinyl alcohol film.

(3) The method disclosed in Japanese Patent Application Kokai No. 54-38142 is a method of obtaining a polarizer containing a portion having a polarizing ability and a portion having no polarizing ability in the same surface by partially applying a coloration-preventing agent on a polyvinyl alcohol film by techniques such as screen printing, etc., and then dyeing the uncoated portions with iodine or a dye.

In Japanese Patent Application Kokai No. 64-18470, a method for producing an oriented thin film with polymerizable molecules is disclosed.

SUMMARY OF THE INVENTION

All the prior art described above has a problem of their process being complicated.

An object of the present invention is to provide a method for producing a polarizer containing in the same surface a plural number of portions which are different in polarizing ability or direction of polarization therebetween by a simplified process.

A second object of the present invention is to provide a polarizer containing in the same surface a plural number of portions which are different in polarizing ability or direction of polarization therebetween, produced by such a process.

The third object of the present invention is to provide liquid crystal display devices using such a polarizer.

For these objects, the present invention is intended to simply realize:

(1) a patterned polarizer by (a) producing a surface having a pre-determined orientation direction on a substrate, and (b) producing a polymerizable molecular layer comprising polymerizable molecules on the oriented surface on the above substrate and polymerizing the molecules into a desired pattern having orientation corresponding to the above orientation direction, and (2) a polarizer containing in the same surface a plural number of portions which are different in polarizing ability or direction of polarization therebetween by repeating this procedure as many times as required.

According to the present invention, a polarizer containing in the same surface a plural number of portions which are different in polarizing ability or direction of polarization therebetween can be obtained by a more simplified manufacturing process than the prior art.

Also, this manufacturing process comprises neither a process of coating with photosensitive resins or masking agents, nor a process of dyeing with iodine or dyes.

Further, patterns of micron order can easily be produced.

In the liquid crystal display device using the polarizer of the present invention, apparent brightness can be improved by giving a polarizing ability to portions alone necessary for display.

Further, it is also possible to let the substrate of a liquid crystal display device have a polarizing ability. In this case, the surface having a polarizing ability can be produced at any of the outside and inside of the device. The conventional polarizers contain iodine, dyes, etc., and because these substances are soluble in the liquid crystal, the surface having a polarizing ability cannot be arranged inside the device. In the polarizer of the present invention, however, the surface having a polarizing ability can be arranged inside the device, and therefore in such a liquid crystal display device, excellent display quality is obtained because there is little image blurring owing to parallax.

Further, there can be obtained liquid crystal stereoscopic display devices using a polarizer of such a constitution that the portions are produced in the form of stripe, and the adjacent portions are different in the direction of polarization axis by 90 degrees therebetween.

BRIEF DESCRIPTION OF THE DRAWINGS

FIGS. 4(a)-4(d), 5(a)-5(d), 6(a)-6(d), and 7(a)-7(h) are flow sheets showing a method for producing the patterned polarizer according to the present invention.

DETAILED DESCRIPTION OF THE PREFERRED EMBODIMENTS

A method for producing the polarizer of the present invention will be illustrated specifically.

First step

The first step of the process is a step to prepare either one of the following substrates (a) to (c) for an underlying substrate.

(a) a substrate covered with an organic thin film in which the molecules have uniformly been oriented in a particular direction in the film surface (hereinafter referred to as underlying substrate A).

(b) A substrate of which the surface has been directly rubbing-treated in a particular direction (hereinafter referred to as underlying substrate B).

(c) A substrate of which the surface has been covered firstly with an organic thin layer and then rubbing-treated in a particular direction (hereinafter referred to as underlying substrate C).

Figure 1A:
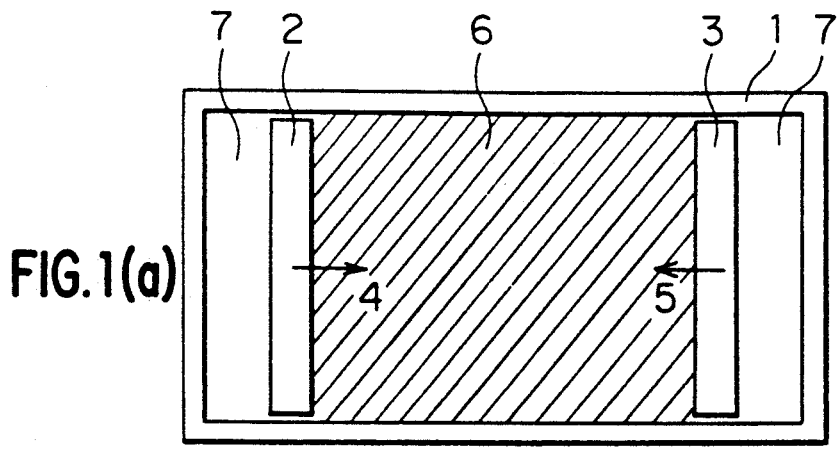
FIGS. 1(a) and 1(b) are a typical plan view and side view of an apparatus for producing an in-plane oriented monomolecular film used in the present invention at a gas/liquid interface.
Figure 1B:
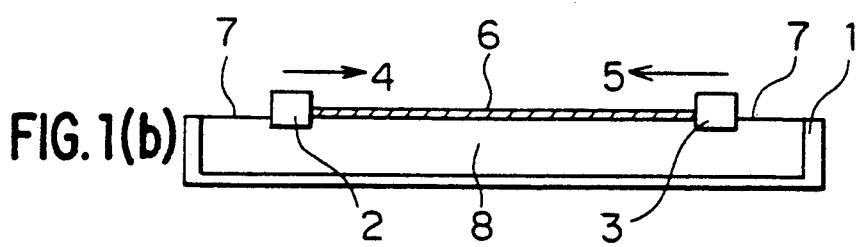

The organic thin film, in which the molecules have uniformly been oriented in a particular direction in the film surface, used in the underlying substrate A can be produced as follows. First, a trough 1 equipped with movable compressing barriers 2 and 3 is prepared for as shown in FIG. 1. FIG. 1(a) shows a plan view of the trough 1, and FIG. 1(b) shows a side view (sectional view) thereof. In FIG. 1, arrows 4 and 5 are a movement direction (direction of compression) of the compressing barriers 2 and 3, respectively, 6 is a water surface on which the film-forming molecules are to be spread, 7 is a clean water surface, and 8 is a water phase. First, the barriers 4 and 5 are moved to the left and right ends, respectively, of the trough to enlarge the area of the water surface 6. In this condition, the film-forming molecules, that is, molecules constituting the oriented organic thin film, are spread on the water surface 6 in the form of monomolecular film. The barriers 4 and 5 are slowly moved toward the right and left, respectively, to compress the spread film on the water surface 6. Movement of the barriers is stopped at a point when the surface pressure of he spread film reaches a definite value. If the film comprises the film-forming substance used in the present invention, the film-forming molecules are uniformly oriented, in this condition, in a particular direction in the film surface. FIG. 1 shows a manner of opposite bidirectional compression of the spread film on the gas/liquid interface, but the same results are also obtained with a manner of unidirectional compression frequently seen in the common LB (Langmuir-Blodgett) film-forming apparatus.

Figure 2A:
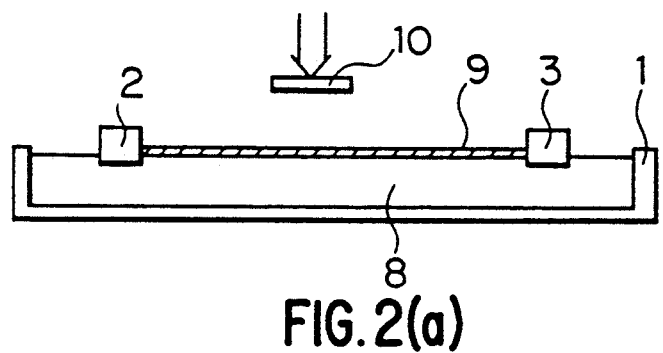
FIGS. 2(a)-2(c) are a flow sheet for illustrating a procedure to transfer the above monomolecular film to a substrate by the horizontal lifting method.
Figure 2B:
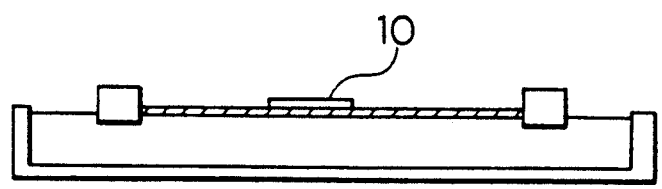
Figure 2C:
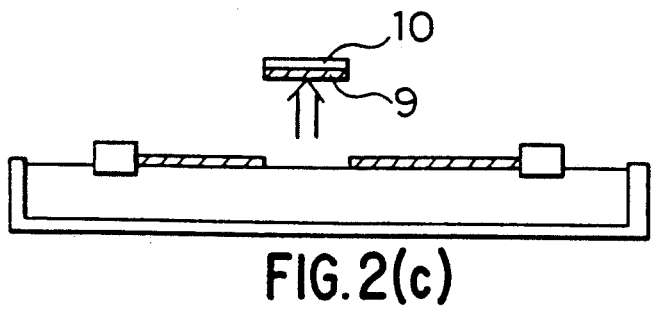
Figure 3A:
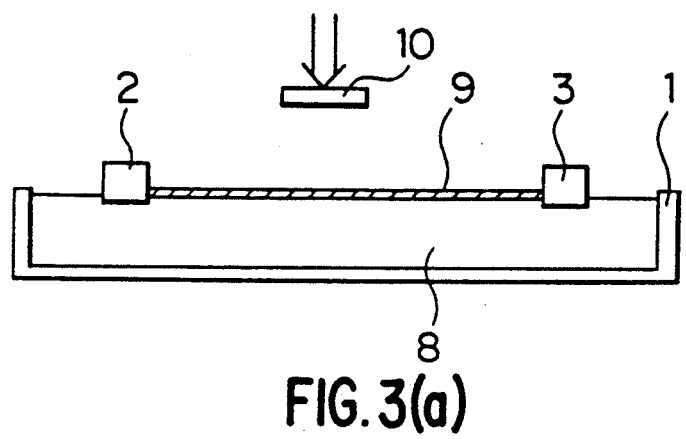
FIGS. 3(a)-3(c) are a flow sheet for illustrating a procedure to transfer the above monomolecular film to a substrate by the horizontal dipping method.
Figure 3B:
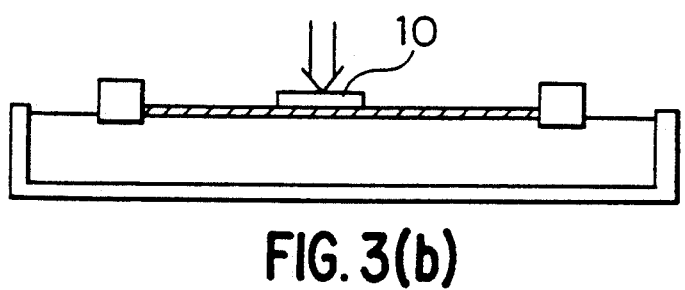
Figure 3C:
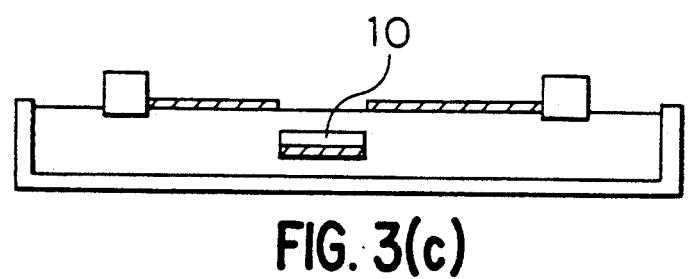
Figure 4A:
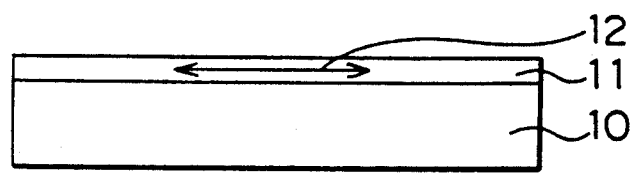
Figure 4B:
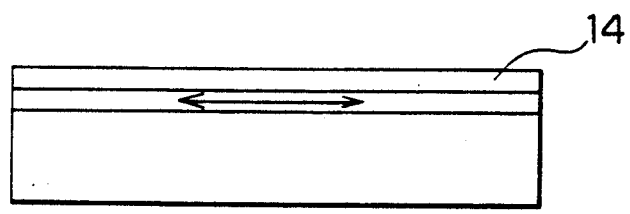
Figure 4C:
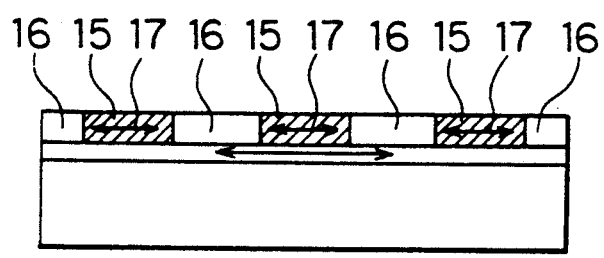
Figure 4D:
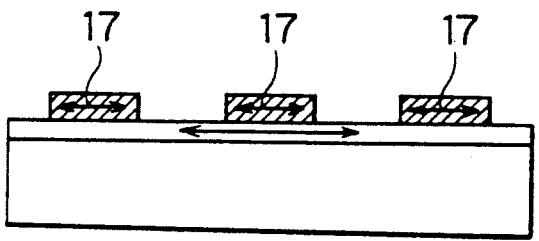
Figure 5A:
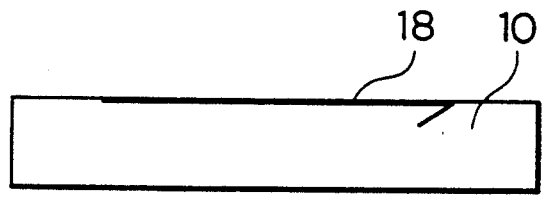
Figure 5B:
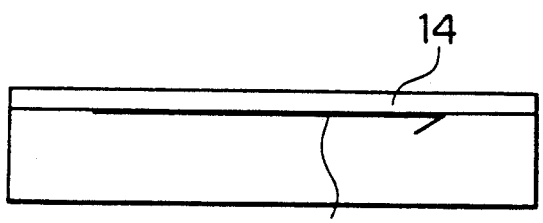
Figure 5C:
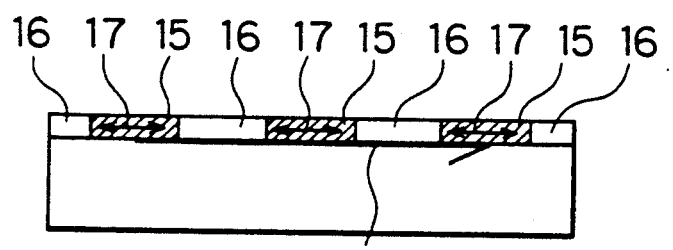
Figure 5D:
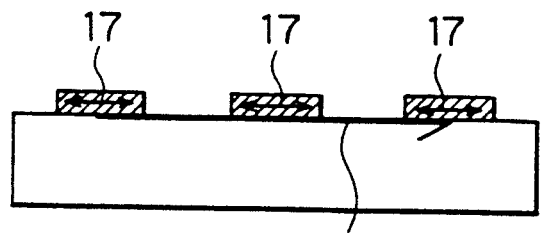
Figure 6A:
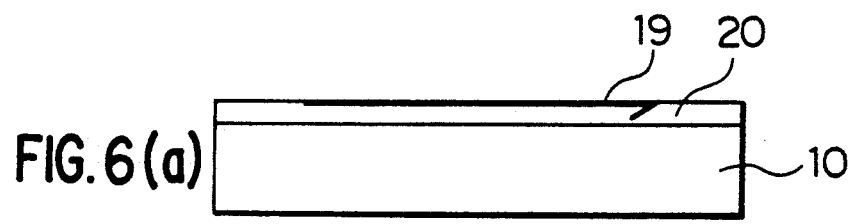
Figure 6B:
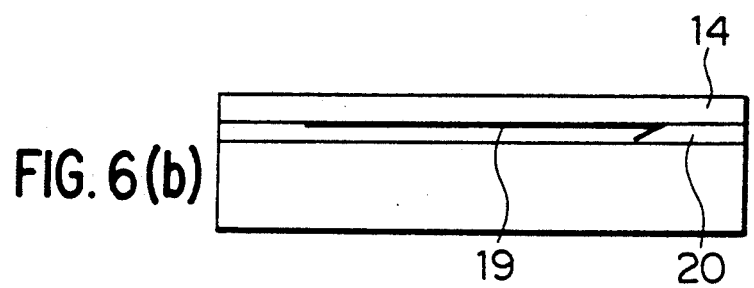
Figure 6C:
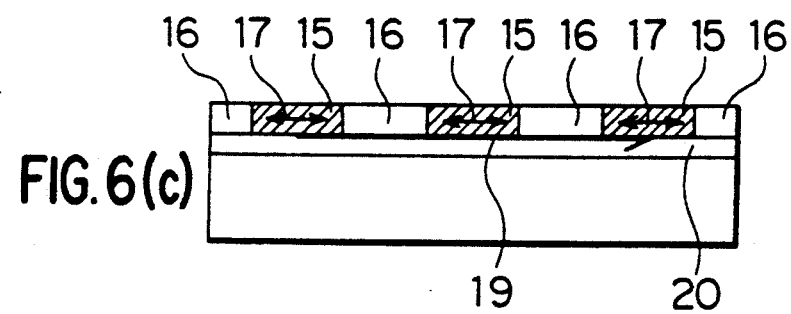
Figure 6D:
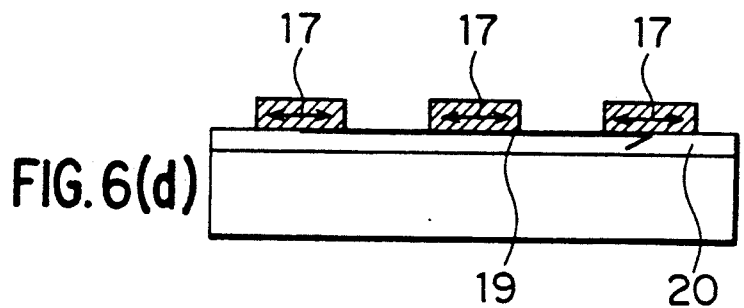

The oriented film produced at the gas/liquid interface by the above procedure can be transferred, without being disturbed in the orientational order and orderness thereof, to a substrate using the lifting method shown in FIG. 2 or the dipping method shown in FIG. 3. In FIGS. 2 and 3, numeral 9 designates an oriented film produced on the liquid surface by the above method, numeral 10 designates a substrate, and other numerals are common to those in FIG. 1. In the lifting method, the substrate as held nearly horizontal is slowly moved down as shown in FIG. 2(a), and as soon as its surface is brought into contact with the film on the liquid surface as shown in FIG. 2(b), it is slowly moved up as shown in FIG. 2(c). At that time, the film on the liquid surface is transferred to the substrate. In the dipping method, the substrate as held nearly horizontal is slowly moved down as shown in FIG. 3(a) and further submerged with it held as it is as shown in FIG. 3(c) even after its surface is brought into contact with the film on the liquid surface as shown in FIG. 3(b). At that time, the film on the liquid surface is transferred to the substrate. The procedure (a) to (c) shown in FIG. 2 or 3 can be repeated in this order as many times as necessary. In this case, as many layers as correspond to the number of repetitions are deposited on the substrate. In any of the lifting method and dipping method, adhesion between the substrate and film can be raised by previous hydrophobic treatment of the substrate surface with silane coupling agents such as hexamethyldisilazane.

In the oriented organic thin film produced at the gas/liquid interface by the above method, the film-forming molecules are usually arranged in in-plane orientation in a direction perpendicular to the direction of compression, and besides the orientation of the molecules is uniform over the whole film surface. Consequently, if the film is produced by the procedure shown in FIG. 2 or 3 with the substrate turned to a desired direction, an oriented film can be produced in which the molecules have been arranged in the same desired in-plane orientation direction in the surface of the substrate.

The rubbing treatment used to produce the underlying substrates B and C refers to unidirectionally rubbing with cloth, etc. the surface of the substrate or organic thin layer covering the substrate. By this treatment, orientation is attained in the direction of rubbing.

The organic thin layer is provided in order to increase the rubbing effect, and thin layers of, for example, polycarbonate, polystyrene, polyvinyl alcohol, polyimide, polyterephthalate, polystyrene, etc. are used.

Second step

The second step of the process is the step of producing a polymerizable molecular layer which comprises polymerizable molecules on the underlying substrate produced in the first step. Formation of the polymerizable molecular layer, although depends upon the kind of polymerizable molecules, can be attained by using either of techniques commonly used to produce organic thin films such as vacuum evaporation method, molecular beam epitaxy method, dipping method, spraying method, spinner method, casting method, adsorption method, etc.

Third step

The third step of the process is the step of polymerizing the molecules in the polymerizable molecular layer produced in the second step into a desired pattern using either of techniques with photomasks, laser beams, electron beams, etc. What is important here is that if a compound constituting the polymerizable molecular layer is properly selected, molecular orientational order already formed on the underlying substrate can be given also to the polymerizable molecular layer. In other words, the molecules in the polymerizable molecular layer, after polymerized, assume in-plane orientation in the same direction as the orientation direction of the underlying substrate.

In the examples of the present invention, the compound used to constitute the polymerizable molecular layer is such a one as developing a color after polymerization, i.e. coming to have an absorption in the region of visible light. On using such a compound, the polymerized portion of the film produced by the above method comes to have a polarizing ability to visible light, and besides the axis of polarization agrees with the orientation direction of the underlying substrate.

Fourth step

The fourth step of the process is the step of removing the portion left unpolymerized in the third step with a solvent which dissolves the unpolymerized portion but not the polymerized portion.

Consequently, if such a process as described above is used, a polarizer can be produced which contains a portion having a polarizing ability and a portion having no polarizing ability in the same surface and besides in which the direction of axis of polarization in the portion having a polarizing ability has been turned to a desired direction.

The process comprising the above four steps is a fundamental process for producing the polarizer of the present invention.

FIGS. 4 to 6 show a notional diagram of the above fundamental process. FIG. 4 shows an outline of the process using the underlying substrate A. Numeral 11 in FIG. 4(a) designates an organic thin film oriented in a particular direction in the film surface, and an arrow 12 is the orientation direction of the molecule. Numeral 14 in FIG. 4(b) designates a polymerizable molecular layer (second step). Numeral 15 in FIG. 4(c) designates a produced polymerized portion represented by hatching, and numeral 16 designates an unpolymerized portion (third step). FIG. 4(d) shows a state after removal of the unpolymerized portion (fourth step). In FIGS. 4(c) and 4(d), an arrow 17 is the orientation direction of molecules in the polymerized portion, i.e. the direction of the axis of polarization. In FIG. 4, the first step of producing the thin film oriented in a particular direction in the film surface at the gas/liquid interface is omitted. FIG. 5 shows the outline of the process using the underlying substrate B. An arrow 18 in FIG. 5(a) is the direction of rubbing applied to the substrate 10. FIG. 5(b) shows a state wherein the polymerizable molecular layer 14 has been produced (second step). FIG. 5(c) shows a state by hatching wherein the polymerized portion 15 has been produced (third step). FIG. 5(d) shows a state wherein the unpolymerized portion has been removed (fourth step). In FIGS. 5(c) and 5(d), an arrow 17 is the orientation direction of molecules in the polymerized portion, i.e. the direction of the axis of polarization.

FIG. 6 shows the outline of the process using the underlying substrate C. An arrow 19 in FIG. 6(a) is the direction of rubbing applied to the organic thin layer 20 on the substrate 10. FIG. 6(b) shows a state wherein the polymerizable molecular layer 14 has been produced (second step). FIG. 6(c) shows a state by hatching wherein the polymerized portion 15 has been produced (third step). FIG. 6(d) shows a state wherein the unpolymerized portion 16 has been removed (fourth step). In FIG. 6(c) and 6(d), an arrow 17 is the orientation direction of molecule in the the polymerized portion, i.e. the direction of the axis of polarization.

By using the process described above, a polarizer containing a portion having a polarizing ability and a portion having no polarizing ability in the same surface is obtained. Consequently, by repeating this process as many times as required, a polarizer containing in the same surface a plural number of portions which are different in polarizing ability therebetween or that containing in the same surface a plural number of portions which are different in the direction of polarization therebetween, can be produced.

FIG. 7 shows one typical embodiment of the process for producing a polarizer containing in the same surface a plural number of portions which are different in the direction of polarization therebetween. Explanation will be given below in the order of steps (a) to (h) in FIG. 7.

(a) The underlying substrate A is prepared for. That is, the organic thin film 11 wherein the molecules have been oriented in the direction of an arrow 12 is produced on the substrate 10 [FIG. 7(a)].

(b) The polymerizable molecular layer 14 is produced on the underlying substrate A [FIG. 7(b)].

(c) The polymerizable molecular layer 14 is polymerized into a desired pattern. The polymerized portion 15 is shown by hatching. An arrow 17 is the orientation direction of molecules in the polymerized portion 15, i.e. the direction of the axis of polarization. Numeral 16 designates the unpolymerized portion [FIG. 7(c)].

(d) The unpolymerized portion 16 is removed with a solvent [FIG. 7(d)].

(e) The organic thin film 11' is produced wherein the molecules have been oriented in the direction of an arrow 12' against the surface obtained by the above steps (a) to (d) [FIG. 7(e)].

(f) The polymerizable molecular layer 14' is produced on the organic thin film 11' [FIG. 7(f)].

(g) The polymerizable molecular layer 14' is polymerized into a desired pattern. The polymerized portion 15' is shown by hatching. An arrow 17' is the orientation direction of molecules in the polymerized portion 15', i.e. the direction of the axis of polarization. Numeral 16' designates the unpolymerized portion [FIG. 7(g)].

(h) The unpolymerized portion 16' is removed with a solvent [FIG. 7(h)].

In the embodiment shown in FIG. 7, the steps (a) to (d) and steps (e) to (h) are substantially the same. However, the latter half steps are carried out so that the orientation direction of molecules in the organic thin film 11' is a direction represented by an arrow 12'; the polymerized portion 15' is not positioned over the polymerized portion 15 produced in the former half steps; and the orientation direction of molecules, shown by an arrow 17', in the polymerized portion 15' is different from that, shown by an arrow 17, in the polymerized portion 15. Thus, as the sectional view of the completed polarizer in FIG. 7(h) shows, a polarizer containing the polymerized portions 15 and 15' of which the axes of polarization are perpendicular to each other, can be produced easily. FIG. 7 shows an example in which the polarization axes of two kinds of portion are perpendicular to each other. If the above method is used, however, the polarization axes of two kinds of portion can be determined so that they form an optional angle. Further, a polarizer containing in the same surface three or more kinds of portion which are different in the direction of polarization axis therebetween, also can be produced by repeating the above steps three times or more.

Further, a polarizer containing in the same surface a plural number of portions which are different in polarizing ability therebetween can also be produced by using a underlying organic thin film of different orientation degree for each polymerizable molecular layer or varying the kind of compound constituting the polymerizable molecular layer for each polymerizable molecular layer and repeating fundamentally the same steps as in FIG. 7.

In the foregoing embodiment, an organic oriented film was used to control the orientation of the polymerizable molecular layer, but the use of this organic oriented film can be replaced by the orientation technique of rubbing used to produce liquid crystal display devices.

Figure 8:
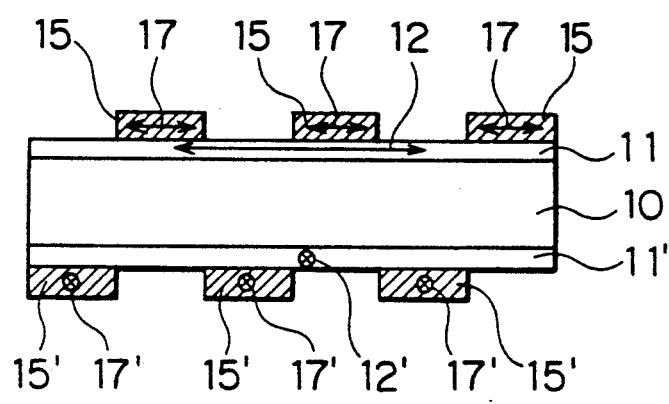
FIG. 8 is a sectional view of the polarizer in one embodiment of the present invention.

All the steps described above are an embodiment for producing a polarizer on one surface alone of the substrate. However, it is also naturally possible as an application of the present invention to produce, on both surfaces of the substrate, the portions which are different in the direction of polarization or polarizing ability therebetween. One example is shown in FIG. 8. That is, the underlying organic thin films 11 and 11' controlling the orientation directions of the polymerized molecular layers are provided at both surfaces of the substrate 10 so that the orientation directions of molecules in both films are different from each other as shown by arrows 12 and 12', respectively, and further, the orientation directions of molecules in the polymerized portions 15 and 15' are made different from each other as shown by arrows 17 and 17', respectively.

Materials for the substrate used in the present invention include, in addition to glass and quartz, plastics such as polyethylene, polypropylene, polyacrylonitrile, polystyrene, polycarbonate, etc.

In the present invention, as examples of a compound which can be used as the film-forming molecule which enables the orientation of molecules to take a definite direction in the film surface by unidirectional or opposite bidirectional compression at the gas/liquid interface, compounds represented by the following formulae (1) to (15) can be given.

(1)

(2)

(3)

(4)

(5)

(6)

(7)

-continued

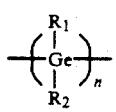 (8)

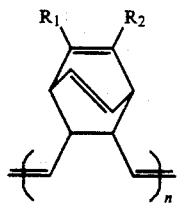 (9)

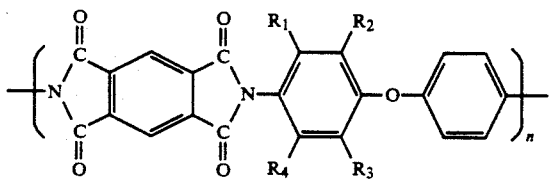 (10)

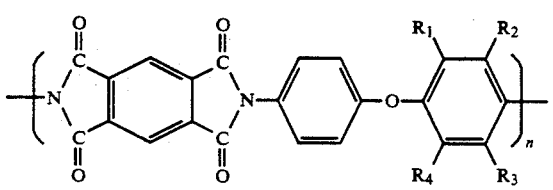 (11)

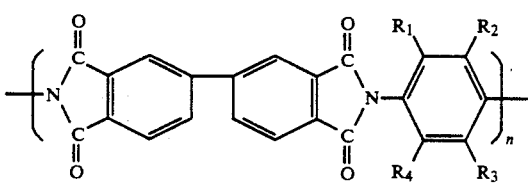 (12)

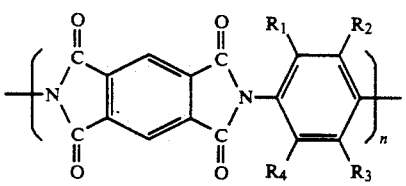 (13)

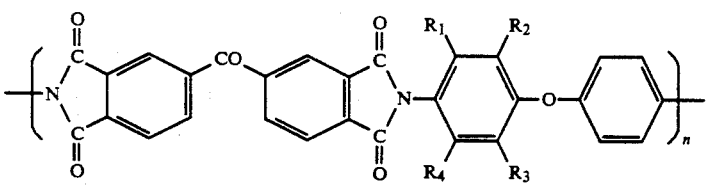 (14)

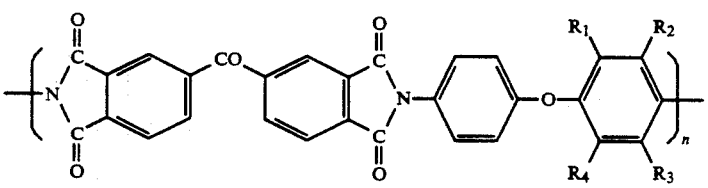 (15)

wherein each of $R_1$, $R_2$, $R_3$ and $R_4$ represents a hydrogen atom or a structure represented by the formula,

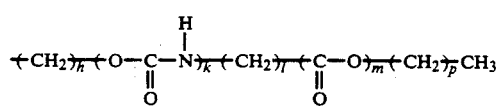

in which h is 2 to 18, k is 0 or 1, l is 1 to 18, m is 0 or 1 and p is 0 to 18, provided that at least one of $R_1$, $R_2$, $R_3$ or $R_4$ contained in the compounds has the structure represented by the above formula.

Among the compounds represented by the formulae (1) to (15), particularly preferred compounds are the following:

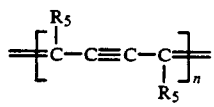

wherein R₅ represents a group represented by the formula,

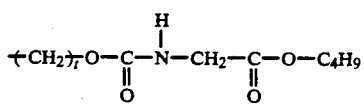

in which t is 2 to 15,

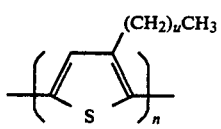

wherein u is 3 to 21, and

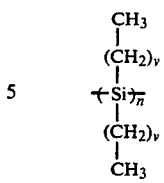

wherein v is 4 to 21.

In the present invention as an example of the compound usable as one constituting the polymerizable molecular layer, compounds represented by the formula (16) can be given:

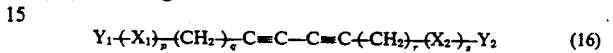    (16)

wherein each of p and s represents 0 or 1, each of q and r represents either one of integers of 1 to 15, each of $X_1$ and $X_2$ represents either one of —OSO₂—, —SO₂O—, —OCO—, —COO—, —CONH—, —NHCO—, —OCONH—, —NHCOO—, —CH₂O— or —OCH₂—, and each of $Y_1$ and $Y_2$ represents either one of an alkyl group, phenyl group, alkylphenyl group, alkoxyphenyl group, halogenated phenyl group, nitrophenyl group, dinitrophenyl group, carbazolyl group, hydroxy group, carboxy group, anthryl group or alkyloxycarbonylalkyl group.

Among the compounds represented by the formula (16), examples of a particularly preferred compound include the following:

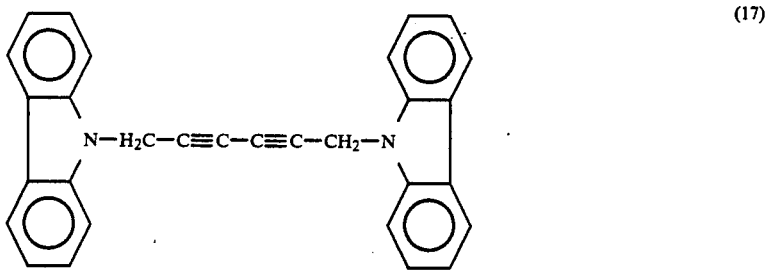    (17)

    (18)

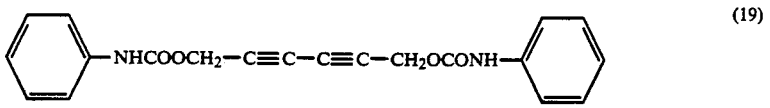    (19)

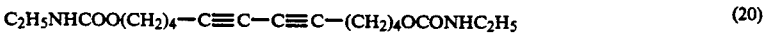    (20)

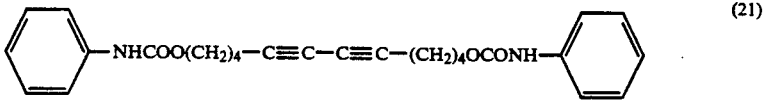    (21)

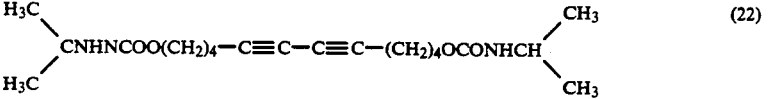    (22)

    (23)

    (24)

    (25)

-continued

(26)

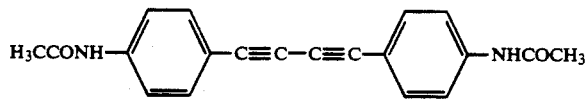
(27)

(28)

That the in-plane orientational order of molecules in the underlying film is given to the overlying layer, i.e. the polymerizable molecular layer after polymerization, is described in detail in a copending U.S. patent application Ser. No. 07/584971 already applied for by the present inventors.

The present invention will be illustrated more specifically with reference to the following example,s but the present invention is not to be interpreted as being limited thereto.

EXAMPLE 1

A 0.5 g/l chloroform solution of a polydiacetylene derivative represented by the formula (29) (hereinafter referred to as p-3BCMU),

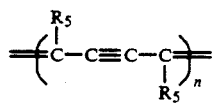
(29)

wherein $R_5$ represents a substituent,

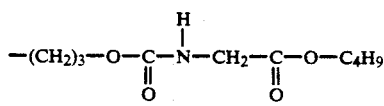

was prepared, and this solution was added dropwise to the surface of pure water in the LB film-manufacturing apparatus shown in FIG. 1. After chloroform vaporized, the compressing barriers were slowly moved in two directions facing each other, as shown in FIG. 1, to compress the spread p-3BCMU film on the water surface. At the point when the surface pressure of the film reached 20 mN/m, the compressing barriers were stopped, and the in-plane orientational order of the p-3BCMU monomolecular film produced on the water surface was evaluated by measuring the polarization reflection spectrum. The measurement with polarized light was carried out by employing linearly polarized light vertically incident on the film on the water surface. As a result, it was found that the intensity of reflection was maximum and minimum when the direction of polarization was perpendicular ($\perp$) to the parallel ($\parallel$) to the compression direction, respectively. From this result, it became clear that the principal chain of the p-3BCMU molecules has been oriented perpendicular to the compression direction in the surface of the above monomolecular film. Also, it was found that, since this polarization characteristic does not show in-plane position dependency, the principal chain of the molecules has been oriented in the same direction and uniformly over the whole p-3BCMU monomolecular film (film area, about 60 cm²) formed on the water surface. Further, it was found that the dichroic ratio at about 620 nm of this film was about 20 from the above spectrum.

The oriented film of p-3BCMU thus produced on the water surface was transferred by only one layer to a transparent glass substrate previously subjected to hydrophobic treatment with hexamethyldisilazane, by the lifting method shown in FIG. 2. It was found that the transferred p-3BCMU film kept its orientational order even on the glass substrate.

Onto the organic thin film of p-3BCMU thus produced on the transparent glass substrate was deposited a diacetylene derivative represented by the formula (17) (hereinafter referred to as DCH) by the vacuum evaporation method. Thus, a polymerizable molecular layer of about 1000 Å in thickness comprising the diacetylene derivative monomer was obtained.

Figure 9A:
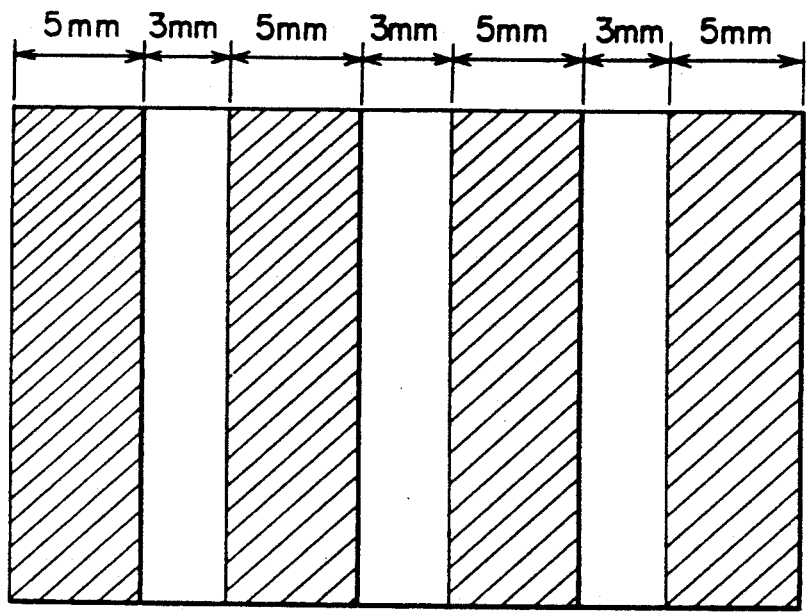
FIGS. 9(a)-9(c) are a diagram showing a pattern of the polarizer in one embodiment of the present invention.
Figure 9B:
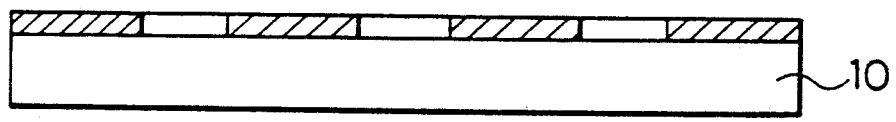

A photomask was applied to this polymerizable molecular layer and irradiated with ultraviolet rays from a mercury lamp to form a stripe-form polymerized pattern of 5 mm in width and 3 mm in interval on the film surface, as shown in FIGS. 9(a) and 9(b). FIG. 9(a) shows a plan view, and FIG. 9(b) shows a sectional view in which the shaded parts show the polymerized portion.

Figure 9C:
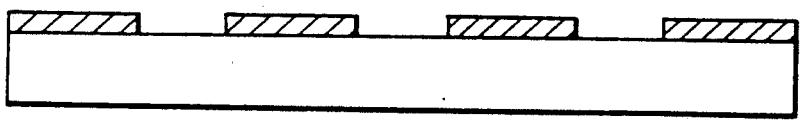

Next, this film was immersed in acetone together with the substrate to dissolve the unpolymerized monomer portion. Thus, a patterned film shown by the sectional view in FIG. 9(c) was obtained. The polarization absorption spectrum of the polymerized portion was measured to find that the direction of polarization maximizing the intensity of absorption resulting from the polymer main chain agreed with the orientation direction of molecules in the p-3BCMU monomolecular film used for the underlying organic thin film. In other words, it was found that the main chain of the DCH polymer produced by polymerization has been oriented in the same direction as that of the polymer main chain of the p-3BCMU monomolecular film which was the underlying organic thin film. The dichroic ratio of the polymerized portion obtained by the measurement of polarization absorption spectrum was about 5 at 650 nm, from which it was found that the polymerized portion had a polarizing ability.

From the results, it was found that a patterned polarizer containing a portion having a polarizing ability and a portion having no polarizing ability in the same surface can be produced by the method of the present invention. Coloration of the p-3BCMU monomolecular film used as the underlying organic thin film was extremely too slight to become a problem in practical use.

EXAMPLE 2

Onto the p-3BCMU monomolecular film produced as the underlying organic thin film on a glass substrate in the same manner as in Example 1 was vacuum-deposited each of diacetylene derivatives shown in Table 1 to produce a polymerizable molecular layer of about 1000 Å in thickness. Thereafter, the same polymerized pattern as in Example 1 was formed on each polymerizable molecular layer by the same process as in Example 1. The dichloric ratio of the polymerized portion obtained by the measurement of polarization absorption spectrum (at 550 nm) is shown in Table 1 for each diacetylene derivative used for deposition. In either case, the polymerized portion was found to be usable as the patterned polarizer.

TABL,E 1

| No. | Compound | Dichloric ratio |
| --- | --- | --- |
| 1 | Formula (18) | 7 |
| 2 | Formula (19) | 5 |
| 3 | Formula (20) | 6 |
| 4 | Formula (21) | 5 |
| 5 | Formula (22) | 4 |
| 6 | Formula (23) | 6 |
| 7 | Formula (24) | 6 |
| 8 | Formula (25) | 6 |
| 9 | Formula (26) | 5 |
| 10 | Formula (27) | 4 |
| 11 | Formula (28) | 4 |

EXAMPLE 3

The oriented monomolecular film of a polydiacetylene derivative represented by the formula (30) (hereinafter referred to as p-4BCMU),

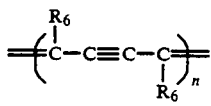
(30)

wherein $R_6$ represents a substituent, $$-(CH_2)_4-O-\underset{\underset{O}{\|}}{C}-\underset{\underset{}{H}}{N}-CH_2-\underset{\underset{O}{\|}}{C}-O-C_4H_9$$

produced as the underlying organic thin film on a glass substrate in completely the same manner as in Example 1. Thereafter, onto the above oriented monomolecular film was deposited a polymerizable molecular layer of about 1000 Å in thickness comprising a diacetylene derivative represented by the formula (24) by the vacuum evaporation method. This polymerizable molecular layer was formed into the same polymerized pattern as in Example 1 by completely the same process as in Example 1. The dichloric ratio of the polymerized portion obtained by measurement of polarization absorption spectrum was about 4, from which it was found that the film of this Example can be used as the patterned polarizer.

EXAMPLE 4

A chloroform solution of a mixture of a polythiophene derivative represented by the formula (31) (hereinafter referred to as PHDT),

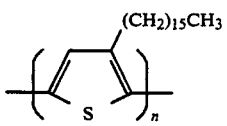
(31)

and p-3BCMU in a 1:1 molar ratio prepared. The oriented monomolecular film of the was produced on the water surface in completely the same manner as in Example 1, and transferred to a glass substrate by the lifting method to obtain the underlying organic thin film. Onto this film was vacuum-deposited DCH to produce a polymerizable molecular layer of about 1000 Å in thickness. This polymerizable molecular layer was formed into the same polymerized pattern as in Example 1 by completely the same process as in Example 1. The dichroic ratio of the polymerized portion obtained by the measurement of polarization absorption spectrum was about 4, from which it was found that the film of this Example can be used as the patterned polarizer.

EXAMPLE 5

A chloroform solution of a mixture of polydihexylsilane represented by the formula (32),

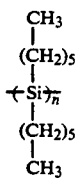
(32)

and p-3BCMU in a 1:1 molar ratio was prepared. The oriented monomolecular film of the mixture was produced on the water surface in completely the same manner as in Example 1, and transferred to a glass substrate by the lifting method to obtain the underlying organic thin film. Onto this film was vacuum-deposited DCH to produce a polymerizable molecular layer of about 1000 Å in thickness. This polymerizable molecular layer was formed into the same polymerized pattern as in Example 1 by completely the same process as in Example 1. The dichroic ratio of the polymerized portion obtained by the measurement of polarization absorption spectrum was 5, from which it was found that the film of this Example can be used as the patterned polarizer.

EXAMPLE 6

A 0.4 wt. % chlorophenol solution of polyethylene terephthalate was spinner-coated onto a glass substrate, and chlorophenol was volatilized by heating to produce an organic thin layer of polyethyleneterephthalate. The surface of this layer was repeatedly rubbed in one direction with silicone cloth to apply rubbing treatment thereto. Onto this layer was vacuum-deposited DCH to produce a polymerizable molecular layer of about 1000 Å in thickness. This polymerizable molecular layer was formed into the same polymerized pattern as in Example 1 by completely the same process as in Example 1. The dichroic ratio of the polymerized portion obtained by the measurement of polarization absorption spectrum was 10, from which it was found that the film of this Example can be used as the patterned polarizer.

EXAMPLE 7

4,4'-Diaminodiphenyl ether represented by the formula (33) and pyromellitic acid dianhydride represented by the formula (34) were polymerized in N-methyl-2-pyrrolidone to obtain a polyamide acid varnish:

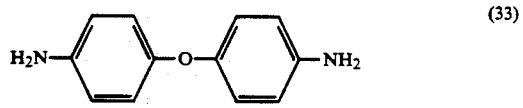
(33)

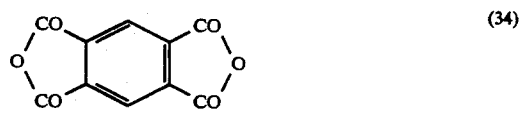
(34)

This polyamide acid varnish was spinner-coated onto a glass substrate and baked at 300° C. to produce the organic thin layer of polyimide. The surface of this layer was repeatedly rubbed in one direction with silicone cloth to apply rubbing treatment thereto. Onto this layer was vacuum-deposited a diacetylene derivative represented by the formula (24) to produce the polymerizable molecular layer of about 1000 Å in thickness. This polymerizable molecular layer was formed into the same polymerized pattern as in Example 1 by the same process as in Example 1. The dichroic ratio of the polymerized portion obtained by the measurement of polarization absorption spectrum was 8, from which it was found that the film of this Example can be used as the patterned polarizer.

EXAMPLE 8

A 0.1 wt. % ethanol solution of a diacetylene compound represented by the formula (21) was applied by the casting method onto the oriented monomolecular film of p-3BCMU produced on a glass substrate in the same manner as in Example 1, and ethanol was volatilized. The polymerizable molecular layer thus obtained was formed into the same polymerized pattern as in Example 1 by the same process as in Example 1. The dichroic ratio of the polymerized portion obtained by the measurement of polarization absorption spectrum was 6, from which it was found that the film of this Example can be used as the patterned polarizer.

EXAMPLE 9

In the same manner as in Example 1, the oriented monomolecular film of p-3BCMU was produced as the underlying organic thin film on a glass substrate. Onto this oriented monomolecular film was deposited DCH by the vacuum evaporation method to produce the polymerizable molecular layer of about 700 Å in thickness. This layer was polymerized into the form of stripe of 3 mm in width and 3 mm in interval in the same manner as in Example 1, and the unpolymerized portion was removed with acetone [FIGS. 7(a) to 7(d)]. Onto the patterned polarizing film thus produced was once more deposited the oriented monomolecular film of p-3BCMU as the second organic thin film so that the orientation direction of the second thin film formed an angle of 90 degrees with that of the firstly produced organic thin film [FIG. 7(e)]. Onto this second thin film was further vacuum-deposited DCH to produce the polymerizable molecular layer of about 700 Å in thickness [FIG. 7(f)]. The polymerizable molecular layer thus produced was polymerized into the form of stripe of 3 mm in width and 3 mm in interval in the same manner as in Example 1. In this case, however, the second vacuum deposition of DCH was carried out so that the portion to be polymerized was not positioned over the polymerized portion firstly produced. The unpolymerized portion was removed to produce a polarizer having a section structure typically shown in FIG. 7(h). Thus, a polarizer was produced which comprised a plural number of portions arranged in the form of stripe, and in which the directions of polarization axis were different by an angle of 90 degrees between the adjacent portions.

Further, the same method as above was carried out using the substrate having the rubbing-treated organic thin layer shown in Example 6. As a result, the same polarizer as above containing portions which were different in the direction of polarization axis by 90 degrees therebetween, was obtained.

EXAMPLE 10

Figure 10:
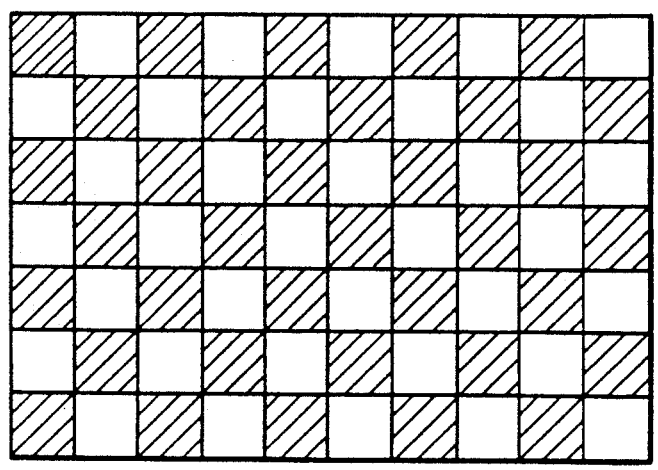
FIG. 10 is a diagram showing a pattern of the polarizer in one embodiment of the present invention.

Such a patterned polarizer as shown in FIG. 10 was produced on a glass substrate with an ITO electrode pattern, using the same materials and method as in Example 1. In FIG. 10, the shaded portion shows a portion having a polarizing ability and the unshaded portion shows a portion having no polarizing ability. The size of one portion was made 500 microns in length and 500 microns in width. Onto this polarizer were deposited two molecular layers of the p-3BCMU monomolecular film so that the orientation direction of the monomolecular film agreed with the direction of polarization axis of the polarizer. One more piece of the same substrate was prepared. These two substrates were faced each other through a spacer of 8 μm so that their surfaces having the deposited film were turned inward and the direction of polarization axis of one polarizer formed an angle of 90 degrees with that of the other one. Thus, a liquid crystal device was obtained. A nematic liquid crystal marketed under the trade name of ZLI-1132 from Merk Co. was put into this liquid crystal device. It was found that the liquid crystal display device thus obtained showed a bright background and a good display quality as compared with the conventional liquid crystal display devices containing a twist-nematic liquid crystal.

Using two pieces polarizer prepared in each of Examples 1 to 9, liquid crystal display devices were produced in the same manner as above. As a result, every liquid crystal display device showed a bright and good display quality.

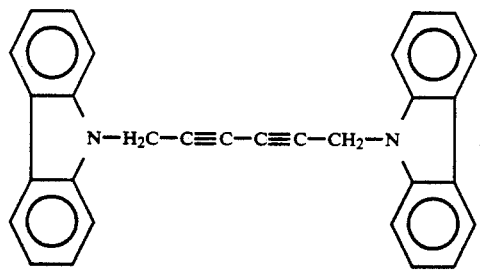

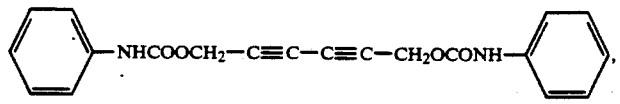

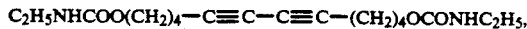

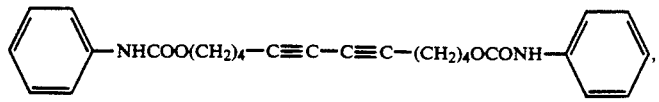

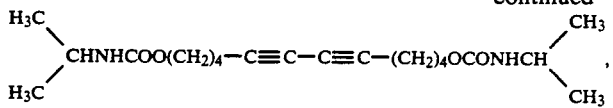
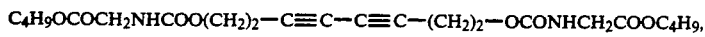
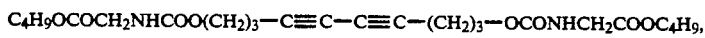
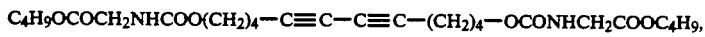
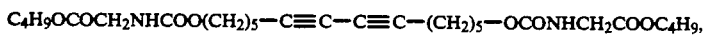
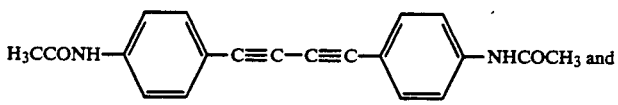
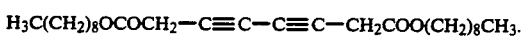
18. A method for producing a polarizer according to one of claims 10 or 11, wherein the molecules in said polymerizable molecular layer comprise at least one diacetylene derivative.
19. A method for producing a polarizer according to claim 18, wherein said diacetylene derivative is at least one member selected from the group consisting of:
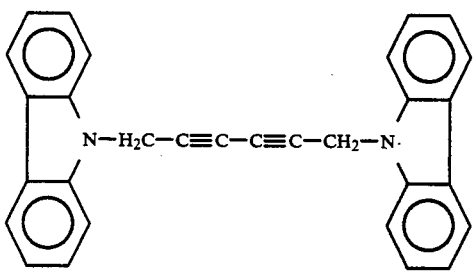
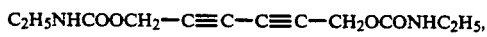
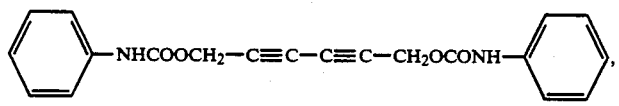
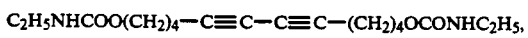
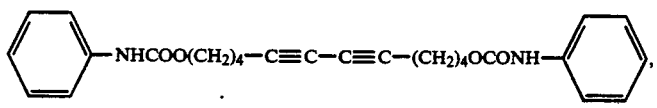
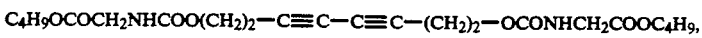
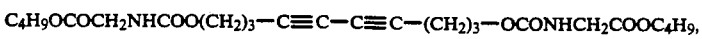
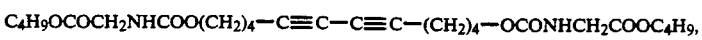

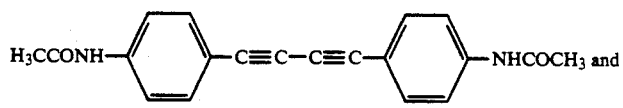
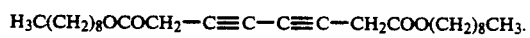

What is claimed is:

1. A polarizer patterned with a plural number of portions having a polarizing ability or direction of polarization which comprises a substrate on which a surface oriented in a pre-determined direction has been produced, and a polymerized molecular layer which has been produced on the above surface and polymerized into a desired pattern and from which the unpolymerized portion has been removed.

2. A polarizer having a plural number of portions comprising a substrate on which a surface oriented in a pre-determined direction has been produced, a polymerized molecular layer which has been produced on the above surface and polymerized into a desired pattern and from which the unpolymerized portion has been removed, a surface which has been produced on the above polymerized molecular layer and oriented in a pre-determined direction and a polymerized molecular layer which has been produced on this surface and polymerized into a desired pattern and from which the unpolymerized portion has been removed, the above polymerized molecular layers being different in polarizing ability or direction of polarization.

3. A polarizer according to claim 1 or 2, wherein said oriented surface is produced by spreading organic molecules at a gas/liquid interface, compressing the spread molecules unidirectionally or in antiparallel directions to orient the molecules in a desired direction and then transferring the oriented organic molecules to the substrate.

4. A polarizer according to claim 1 or 2, wherein said oriented surface is produced by applying a rubbing treatment to the substrate.

5. A polarizer according to claim 2, wherein every polymerized molecular layer develops a color.

6. A polarizer according to claim 5, wherein the oriented surface is produced by spreading organic molecules at a gas/liquid interface, compressing the spread molecules unidirectionally or in antiparallel directions to orient the molecules in a desired direction and then transferring the oriented organic molecules to the substrate.

7. A polarizer according to claim 5, wherein the oriented surface is produced by applying a rubbing treatment in a desired direction.

8. A liquid crystal display device provided with a polarizer patterned with a plural number of portions having a polarizing ability or direction of polarization which comprises a first substrate on which a surface oriented in a pre-determined direction has been produced and a polymerized molecular layer which has been produced on the above surface and polymerized into a desired pattern and from which the unpolymerized portion has been removed, and a second substrate, the above polarizer and second substrate holding a liquid crystal therebetween, and a wiring for giving electric field to said liquid crystal being provided on each of the above polarizer and second substrate.

9. A liquid crystal display device provided with a polarizer having a plural number of portions comprising a first substrate on which a surface oriented in a predetermined direction has been produced, a polymerized molecular layer which has been produced on the above surface and polymerized into a desired pattern and from which the unpolymerized portion has been removed, a surface which has been produced on the above polymerized molecular layer and oriented in a pre-determined direction and a polymerized molecular layer which has been produced on this surface and polymerized into a desired pattern and from which the unpolymerized portion has been removed, the above polymerized molecular layers being different in polarizing ability or direction of polarization, and a second substrate, the above polarizer and second substrate holding a liquid crystal therebetween, and a wiring for giving electric field to said liquid crystal being provided on each of the above polarizer and second substrate.

10. A method for producing a polarizer patterned with a plural number of portions having a polarizing ability or direction of polarization comprising the first step of producing a surface oriented in a pre-determined direction on a substrate, the second step of producing a polymerizable molecular layer which comprises polymerizable molecules on the above surface, the third step of polymerizing the molecules in said polymerizable molecular layer into a desired pattern and the fourth step of removing the unpolymerized portion of said polymerizable molecular layer.

11. A method for producing a polarizer having in the same surface a plural number of portions which are different in polarizing ability or direction of polarization therebetween comprising the first step of producing a surface oriented in a pre-determined direction on a substrate, the second step of producing a polymerizable molecular layer which comprises polymerizable molecules on the above surface, the third step of polymerizing the molecules in said polymerizable molecular layer into a desired pattern, the fourth step of removing the unpolymerized portion of said polymerizable molecular layer, and the step of repeating the above first step to fourth step as many times as required with the orientation direction varied.

12. A method for producing a polarizer according to claim 10 or 11, wherein said first step is the step wherein organic molecules are spread at a gas/liquid interface and compressed unidirectionally or in antiparallel directions to orient the organic molecules in a desired direction, and the oriented organic molecules are transferred to a substrate.

13. A method for producing a polarizer according to claim 12, wherein the molecules in said polymerizable molecular layer comprise at least one diacetylene derivative.

14. A method for producing a polarizer according to claim 13, wherein said diacetylene derivative is at least one member selected from the group of:

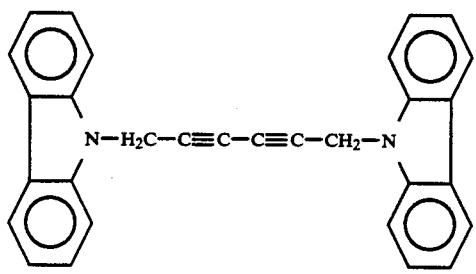

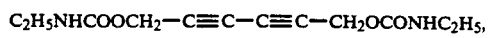

-continued

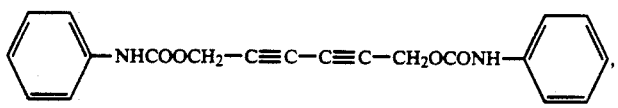

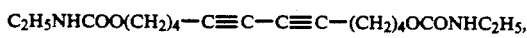

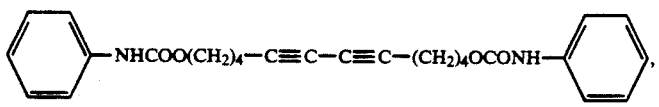

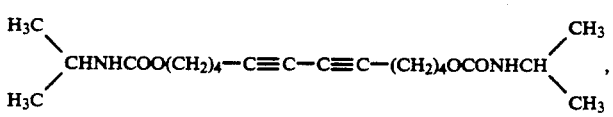

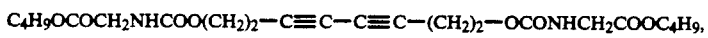

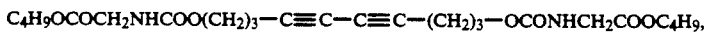

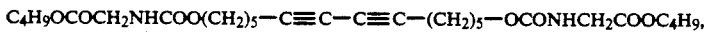

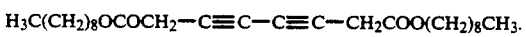

15. A method for producing a polarizer according to claim 10 or 11, wherein said first step is the step of applying a rubbing treatment to the substrate.

16. A method for producing a polarizer according to claim 15, wherein the molecules in said polymerizable molecular layer comprise at least one diacetylene derivative.

17. A method for producing a polarizer according to claim 16, wherein said diacetylene derivative is at least one member selected from the group of: